No. 885,951. PATENTED APR. 28, 1908.
A. L. POST.
APPARATUS FEEDING MATERIALS TO A MIXER.
APPLICATION FILED FEB. 12, 1906.

3 SHEETS—SHEET 1.

WITNESSES:
Daniel E. Daly.
B. C. Brown.

INVENTOR
Alvah L. Post
BY
ATTORNEYS

No. 885,951. PATENTED APR. 28, 1908.
A. L. POST.
APPARATUS FOR FEEDING MATERIALS TO A MIXER.
APPLICATION FILED FEB. 12, 1906.

3 SHEETS—SHEET 2.

WITNESSES:
Daniel E Haly
B. C. Brown

INVENTOR
Alvah L. Post
BY
[signature]
ATTORNEYS

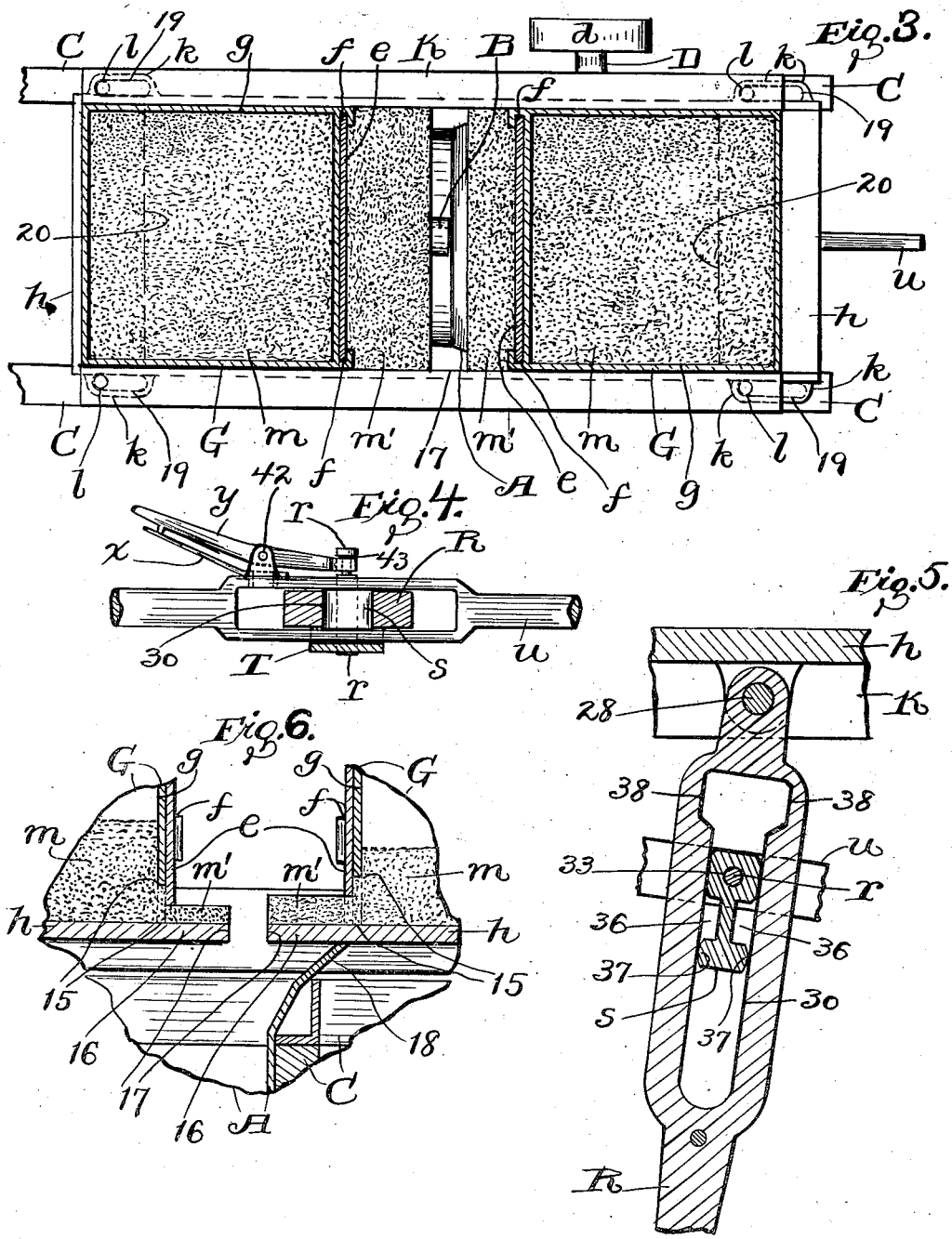

UNITED STATES PATENT OFFICE.

ALVAH L. POST, OF KENT, OHIO, ASSIGNOR TO THE KENT MACHINE COMPANY, OF KENT, OHIO, A CORPORATION OF OHIO.

APPARATUS FOR FEEDING MATERIALS TO A MIXER.

No. 885,951.          Specification of Letters Patent.        Patented April 28, 1908.

Application filed February 12, 1906. Serial No. 300,727.

*To all whom it may concern:*

Be it known that I, ALVAH L. POST, a citizen of the United States of America, residing at Kent, in the county of Portage and State of Ohio, have invented certain new and useful Improvements in Apparatus for Feeding Materials to a Mixer; and I hereby declare the following to be a full, clear, and exact description of the invention, such as will enable others skilled in the art to which it pertains to make and use the same.

Figure 1:
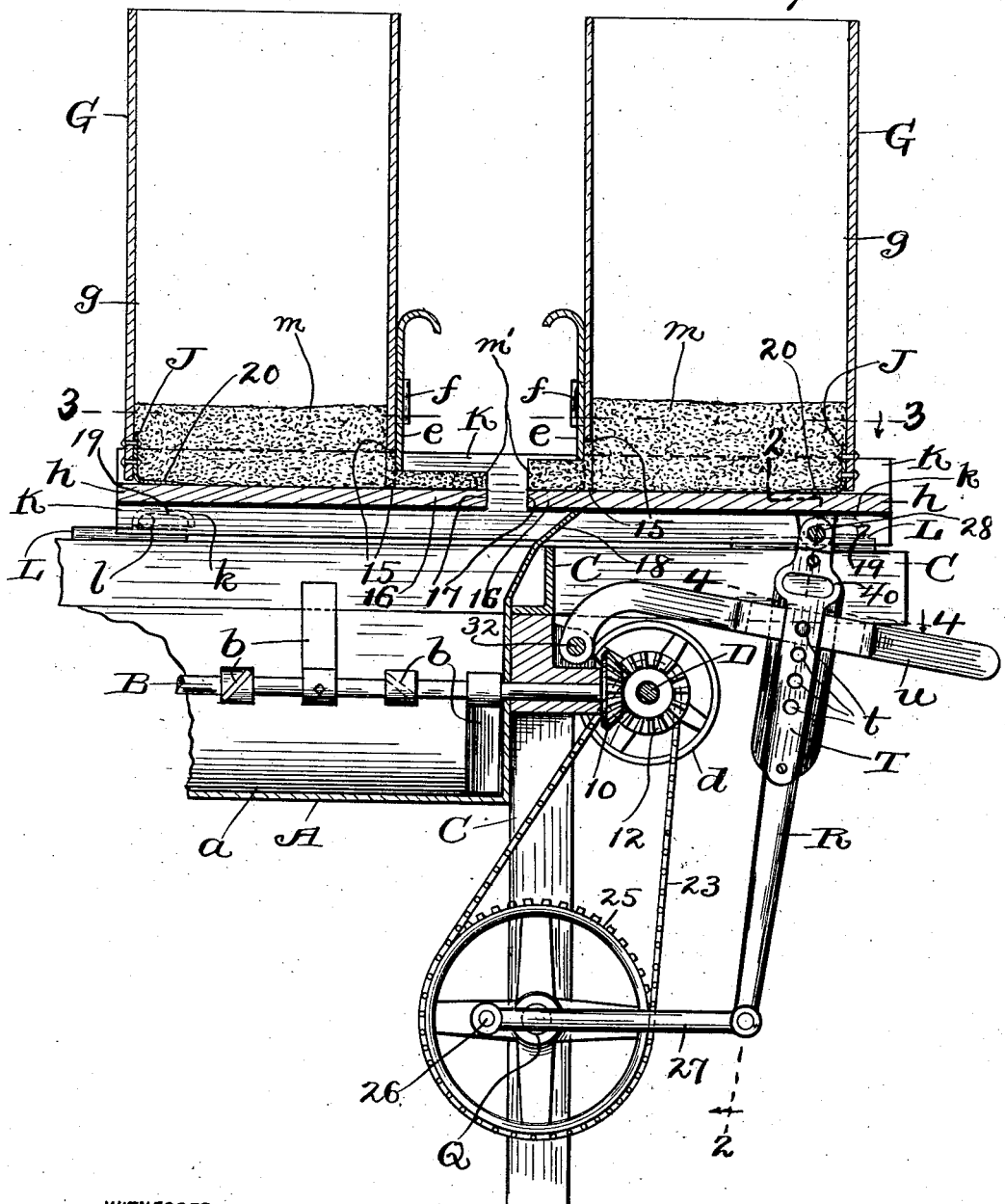
Figure 2:
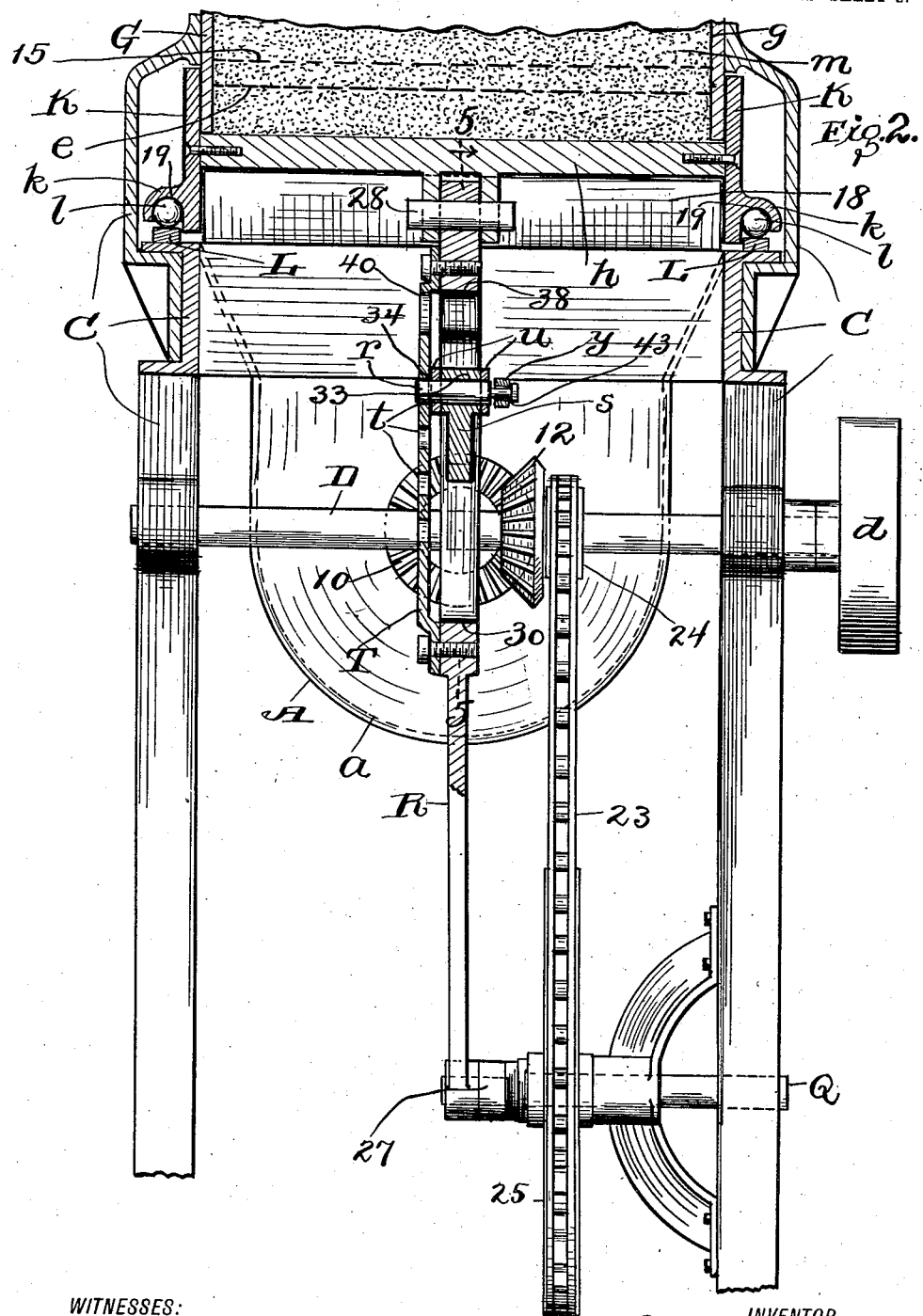

My invention relates to improvements in apparatus for feeding materials, such as sand and cement to a mixing apparatus.
The objects of my invention are to feed two materials to a mixer at rates variable simultaneously and without varying the relative proportions of the materials fed, to discharge the two materials into the mixer as nearly contiguous as possible and to provide means, in part adjunctive to the means for varying the feeding rates, for rendering the feeding mechanism inoperative without stopping the power shaft. I attain these objects by means of mechanism and features of construction illustrated in the accompanying drawings in which Figure 1 is a side elevation, largely in central section, of apparatus embodying my invention; Fig. 2, a section on line 2—2, Fig. 1, looking in the direction indicated by the arrow; Fig. 3, a sectional plan view on line 3—3, of Fig. 1; Fig. 4, a sectional plan view on line 4—4, of Fig. 1; Fig. 5, a section on line 5—5, Fig. 2, looking in the direction indicated by the arrow and Fig. 6, a section showing a portion of the apparatus illustrated in Fig. 1, illustrating the operation of the bottoms of the hoppers. Figs. 2, 4 and 5 are drawn to a larger scale than Figs. 1, 3 and 6.

In the drawings, a mixer of the "pugmill" type is shown, of which A, is the trough, forming the mixing chamber a, and B, the rotary mixing shaft provided with the usual mixing and conveying blades b. The shaft B, is operated by a power shaft D, and pulley d, through bevel gears 12, and 10; the shafts and trough being suitably supported by C, the frame work of the machine.

Arranged above the mixing chamber and suitably supported by the frame work C, are two hoppers G, in the chambers g, of which are contained the materials m, to be propor-
tioned. The lower end of each hopper chamber is closed by a movable bottom h. The two bottoms h, are preferably rigidly secured together by being each secured to and between the two side bars K, and are separated sufficiently to form a discharging space 17, between them. The bars K, may extend above the upper surfaces of the bottoms h, thus forming flanges overlapping the lower ends of the hoppers. The bottoms h, may be mounted on the stationary frame work in any suitable way for reciprocation in tandem. This mounting as shown in the drawings comprises the bearing lugs k, in which are formed ball races 19, the bearing members L, secured to the frame work, and the bearing balls l.
The two hoppers G, are separated somewhat to form a discharging space between them. Each hopper has a lateral discharge opening 15, in its side wall facing toward the other hopper, extending the entire width of the hopper chamber and immediately above the hopper bottom h. The bottoms h, are of sufficient length to permit of their maximum reciprocating movement and yet always close the hopper chamber from below and to also allow a portion 16, of each bottom to always extend beyond the discharge side of its respective hopper sufficiently to prevent any continuous discharge of the contents thereof by gravity, through the opening 15, and space 17.

Each or either of the hoppers may be provided with a vertically adjustable gate e, fitted to slide between guides f, for varying the height of their discharge openings and thus controlling the discharge of material from the hoppers to vary the relative proportions of the materials fed therefrom. To prevent leakage between the hopper bottoms and the walls of the hoppers opposite to the discharge openings, an apron plate J, having a wing extension 20, overlapping the hopper bottom, is secured to each of said walls as shown.

In operation it will be seen that as either feeding bottom h, moves outwardly or from its respective hopper it carries with it therefrom a layer of material equal in thickness to the height of the discharge opening through which said material passes and that as the backward movement of the bottom toward the hopper cannot carry the layer of material back into the hopper, the bottom h, will be withdrawn from under a portion of said layer, thus allowing said portion to fall through the space 17, between the bottoms $h$, into the mixing chamber. The reciprocating movements of the bottoms $h$, thus discharge the materials from the two hoppers into the mixing chamber alternately and in contact with each other. The reciprocating movements of the bottoms $h$, are transmitted from a crank operated by the rotary shaft D. The crank illustrated in the drawings consists of a sprocket wheel 25, suitably mounted for rotation, either on or with a shaft Q, supported from the frame C, and is provided with a laterally projecting wrist pin 26, and operated by a sprocket wheel 24, and chain 23, from the shaft D. The crank wrist 26, is operatively connected by a connecting rod 27, to the lower end of an oscillatory feed lever R, the connection of the rod to the lever being flexible. The upper end of the feed lever R, is pivotally connected, as at 28, to lugs depending from and integral with one of the hopper bottoms $h$. Through the feed lever R, there is a transverse and parallel slot 30, extending longitudinally thereof and terminating at its upper end in an enlargement thereof in both directions, as at 38.

A fulcrum bearing block $s$, is fitted to slide longitudinally of the feed lever R, within the parallel slot 30. The surfaces of the sides of the upper end of the fulcrum block $s$, which come in contact with the feed levers are flat and parallel while those of its lower end, as at 37, are curved to a circle equal in diameter to the width of the slot 30. The central portion of block $s$, is made narrow by cutting away at opposite sides, as at 36. The bearing block $s$, is not at all necessary to the perfect operation of this mechanism, and is only used for the purpose of increasing the area of the bearing, or wearing surface, of the fulcrum pin. If the bearing block is omitted the width of the slot 30, must of course be made to fit the fulcrum pin. A fulcrum adjusting lever $u$, is pivotally secured at one end to the frame work C, at 32, and extends therefrom across the feed lever R, transversely and terminates with an actuating handle at its free end. There is an opening or slot through the fulcrum-adjusting lever $u$, in which the feed lever R, and the fulcrum bearing block $s$, operate. The fulcrum-adjusting lever $u$, and the fulcrum bearing block $s$, within the slot 30, are connected together by a fulcrum pin $r$, which extends transversely through them and is fitted to move freely in the bearing holes 34, in the arm $u$, and 33, in the upper end of block $s$. The fulcrum pin and the fulcrum bearing block may thus be carried by the fulcrum-adjusting lever to any position desired within the slot 30. For retaining the fulcrum pin and the fulcrum bearing block in different positions along the slotted portion of the feed lever R, a retaining plate T, is secured to one side of said lever opposite the slot 30, as shown. Through the plate T, there are a number of retaining perforations $t$, and 40, adapted to receive the end of the fulcrum pin $r$, so located as to successively register with said pin end as the same is carried from one extremity of its movement to the other by the fulcrum-adjusting lever $u$. The fulcrum pin $r$, has a movement endwise sufficient to allow a portion of said pin to enter and to be withdrawn from the perforations in the retaining plate T.

A latch lever $y$, is pivoted at its fulcrum 42, to the side of the fulcrum adjusting lever $u$. One end of the latch lever lies in an annular groove 43, formed in the fulcrum pin $r$, while the opposite arm of said lever $y$, is in position to be grasped together with the handle of the fulcrum adjusting lever, by the hand of the operator. For withdrawing the fulcrum pin from engagement with the retaining plate T, the latch lever $y$, is actuated by the hand of the operator against the action of a suitable spring $x$, properly mounted for actuating said latch lever to throw the fulcrum pin into engagement with the retaining plate and to retain it there. The upper end of the retaining plate T, is provided with a slot 40, elongated transversely of the plate.

When the end of the fulcrum pin $r$, is within the elongated perforation 40, the upper end of the fulcrum block $s$, is within the laterally enlarged upper end 38, of the slot 30, and the feed lever therefore cannot pivot on the fulcrum pin $r$, and thus reciprocate the bottoms $h$, but is permitted by the enlargement 38, of slot 30, the elongation of perforation 40, and the form of block $s$, to be swung idly on its pivotal connection with the hopper bottom $h$, at 28, thus allowing the power shaft to operate without operating the hopper bottoms. With the fulcrum pin $r$, retained in any perforation in the plate T, other than slot 40, the action of the crank and connecting rod 27, causes the lever R, to oscillate, pivoting on the substantially stationary fulcrum pin $r$. The hopper bottoms $h$, being connected to the upper end of the feed lever R, are thus given a reciprocating movement, the length or extent of which is increased or diminished by shifting the fulcrum pin $r$, farther from or nearer to the pivotal connection 28. The frequency of the reciprocations of the bottoms $h$, being constant, it will be seen that, as the amount of the material discharged from the hoppers during each reciprocation of the bottoms $h$, depends on the length or extent of the reciprocating movement, the rate at which the materials are discharged is varied by varying the length of the reciprocating movements of the bottoms $h$, and that, as the change in the length of the reciprocating movements is always the same for both bottoms $h$, the relative proportions of the materials discharged are not affected by thus changing the rates of discharge.

What I claim as my invention and desire to secure by Letters Patent is:—

1. In a feeding apparatus, two stationary hoppers separated by a discharge space, in combination with two hopper bottoms separated by a discharge space, connected together and mounted and adapted to be reciprocated together, each having a lateral discharge outlet leading into the space between the hoppers, and the hopper bottoms adapted to always intercept the materials discharged from the hoppers, so that, in operation, the hopper bottoms convey the materials from the hoppers and discharge them near together through the space between said bottoms.

2. In a feeding apparatus, two stationary hoppers separated by a discharge space and each having a lateral outlet into said discharge space, in combination with two movable hopper bottoms separated by a discharge space, mounted, connected together and adapted for simultaneous reciprocation and adapted to always intercept the materials discharged from the hoppers, means adapted and connected for actuating the hopper bottoms, and means adapted to vary the extent of the movements of said hopper bottoms; so that, in operation, the hopper bottoms convey the materials from the hoppers and discharge them near together at adjustably variable rates.

3. In a feeding apparatus, two stationary hoppers separated by a space into which there is a lateral outlet from each hopper, and two movable hopper bottoms separated by a discharge space, said bottoms being mounted and connected together for simultaneous operation and adapted to always intercept the materials discharged from the hoppers, in combination with an oscillatory feed lever connected for operating the hopper bottoms, a fulcrum pivot on which the feed lever oscillates, adapted to be shifted along said feed lever, means for shifting the fulcrum pivot along the feed lever, and means for retaining said fulcrum pivot in different positions along said feed lever; so that, in operation, the hopper bottoms convey the materials from the hoppers and discharge them near together, at adjustably variable rates.

4. In a feeding apparatus two stationary hoppers separated by a space into which there is a lateral outlet, and two movable hopper bottoms separated by a discharge space, mounted, connected together for simultaneous operation and adapted to always intercept the materials discharged from the hoppers, in combination with an oscillatory feed lever connected for operating the hopper bottoms, a fulcrum pivot on which the feed lever oscillates adapted to be shifted along said feed lever, an adjusting lever adapted and connected to shift the fulcrum pivot longitudinally of the feed lever and a retaining device adapted to retain the fulcrum pivot in different positions along the feed lever; so that, in operation, the hopper bottoms convey the materials from the hoppers and discharge them near together at adjustably variable rates.

5. In a feeding apparatus, two stationary hoppers separated by a space into which there is a lateral outlet from each hopper, and two movable hopper bottoms separated by a discharge space, said bottoms being mounted and connected together and adapted for simultaneous operation and adapted to always intercept the materials discharged from the hoppers, in combination with an oscillatory feed lever connected for operating the hopper bottoms, a fulcrum pivot on which the feed lever oscillates, adapted to be shifted along said feed lever, an adjusting lever adapted and connected to shift the fulcrum pivot longitudinally of the feed lever, a retaining plate adapted to retain the fulcrum pivot in different positions along the feed lever and a hand lever adapted and connected to shift the fulcrum pivot into and out of engagement with the retaining plate; so that, in operation, the hopper bottoms convey the materials from the hoppers and discharge them near together at adjustably variable rates.

6. In a feeding apparatus, two stationary hoppers separated by a space into which there is a lateral outlet from each hopper, and two movable hopper bottoms separated by a discharge space, said bottoms being mounted and connected together for simultaneous operation and adapted to always intercept the materials discharged from the hoppers, in combination with an oscillatory feed lever connected for operating the hopper bottoms, a fulcrum pivot, on which the feed lever oscillates, adapted to be shifted along said feed lever, a fulcrum bearing block fitted to be guided by and to slide longitudinally of the feed lever and connected to the fulcrum pivot, an adjusting lever adapted and connected to shift the fulcrum pivot longitudinally of the feed lever, a retaining plate adapted to retain the fulcrum pivot in different positions along the feed lever and a hand lever adapted and connected to shift the fulcrum pivot into and out of engagement with the retaining plate; so that, in operation, the hopper bottoms convey the materials from the hoppers and discharge them near together at adjustably variable rates.

7. In a feeding apparatus, two stationary hoppers or compartments each having a lateral outlet, and two movable hopper bottoms, said bottoms being mounted and connected and adapted to be operated in unison and always intercept the materials discharged from the hoppers, in combination with an oscillatory feed lever connected for operating the hopper bottoms, a fulcrum pivot, on which the feed lever oscillates, adapted to be shifted along said feed lever, means for shifting the fulcrum pivot along the feed lever and means for retaining the said fulcrum pivot in different positions along the feed lever; so that in operation the hopper bottoms convey and discharge the materials from the hoppers at adjustably variable rates.

8. In a feeding apparatus, two stationary hoppers or compartments each having a lateral outlet, and two movable hopper bottoms, said bottoms being mounted and connected and adapted to be operated in unison and always intercept the materials discharged from the hoppers, in combination with an oscillatory feed lever connected for operating the hopper bottoms, a fulcrum pivot, on which the feed lever oscillates, adapted to be shifted along said feed lever, an adjusting lever adapted and connected to shift the fulcrum pivot longitudinally of the feed lever and a retaining device adapted to retain the fulcrum pivot in different positions along the feed lever; so that, in operation, the hopper bottoms convey and discharge the materials from the hoppers at adjustably variable rates.

9. In a feeding apparatus, two stationary hoppers or compartments each having a lateral outlet, and two movable hopper bottoms, said bottoms being mounted and connected and adapted to be operated in unison and always intercept the materials discharged from the hoppers, in combination with an oscillatory feed lever connected for operating the hopper bottoms, a fulcrum pivot pin about which the feed lever oscillates, adapted to be shifted along said feed lever, a fulcrum bearing block fitted to be guided by and to slide longitudinally of the feed lever and mounted to oscillate about said fulcrum pin, an adjusting lever adapted and connected to shift the fulcrum pivot pin longitudinally of the feed lever, a retaining plate adapted to retain the fulcrum pivot pin in different positions along the feed lever and a hand lever adapted and connected to shift the fulcrum pivot pin into and out of engagement with the retaining plate; so that, in operation, the hopper bottoms convey and discharge the materials from the hoppers at adjustably variable rates.

10. In a feeding apparatus, two stationary hoppers separated by a space into which there is a lateral outlet from each hopper, and two movable hopper bottoms separated by a discharge space, said bottoms being mounted and connected together for simultaneous operation and adapted to always intercept the materials discharged from the hoppers, in combination with an oscillatory feed lever connected for operating the hopper bottoms, a fulcrum pivot on which the feed lever oscillates, adapted to be shifted along said feed lever, an adjusting lever adapted and connected to shift the fulcrum pivot along the feed lever, and a retaining device adapted to retain said fulcrum pivot in different positions along the feed lever, said retaining device and said feed lever being adapted to allow the latter to swing without moving the hopper bottoms, when the fulcrum pivot is brought to one extremity of its movement; so that, in operation, the hopper bottoms convey the materials from the hoppers and discharge them near together at rates adjustably variable from zero to maximum.

11. In a feeding apparatus, two stationary hoppers or compartments each having a lateral outlet, and two movable hopper bottoms mounted and connected to be operated in unison and always intercept the materials discharged from the hoppers, in combination with an oscillatory feed lever connected for operating the hopper bottoms, a fulcrum pivot on which the feed lever oscillates, adapted to be shifted along said feed lever, means adapted and connected to shift the fulcrum pivot along the feed lever and means for retaining said fulcrum pivot in different positions along said feed lever, said retaining means and said feed lever being adapted to allow the latter to swing without moving the hopper bottoms when the fulcrum pivot is brought to one extremity of its movement; so that, in operation, the hopper bottoms convey and discharge the materials from the hoppers at rates adjustably variable from maximum to zero.

12. In a feeding apparatus, two stationary hoppers separated by a space into which there is a lateral outlet from each hopper, and two movable hopper bottoms separated by a discharge space, said bottoms being mounted and connected together for simultaneous operation and adapted to always intercept the materials discharged from the hoppers, in combination with an oscillatory feed lever connected for operating the hopper bottoms, a fulcrum pivot on which the feed lever oscillates, adapted to be shifted along said feed lever, means for shifting the fulcrum pivot along the feed lever and means for retaining the said pivot in different positions along the feed lever, said retaining means and said feed lever being adapted to permit the latter to swing without moving the hopper bottoms when the fulcrum pivot is at one extremity of its movement; so that, in operation, the hopper bottoms convey the materials from the hoppers and discharge them near together at rates adjustably variable from maximum to zero.

13. In a feeding apparatus, two stationary hoppers separated by a space into which there is a lateral outlet from each hopper, and two movable hopper bottoms separated by a discharge space, said bottoms being mounted and connected together for simultaneous operation and adapted to always intercept the materials discharged from the hoppers, in combination with an oscillatory feed lever connected for operating the hopper bottoms and having a longitudinal slot, a fulcrum bearing block slidable within the slot in the feed lever, a fulcrum pivot about which the feed lever and fulcrum bearing block oscillate and which pivot has a bearing in and through said bearing block, an adjusting lever adapted and connected for shifting the fulcrum pivot and fulcrum bearing block along the feed lever, a retaining plate adapted to retain the fulcrum pivot in different positions along the feed lever and a hand lever adapted and connected for shifting said pivot into and out of engagement with the retaining plate, one end of the slot in the feed lever being widened, the fulcrum bearing block cut away on both bearing sides between its two slot fitting end portions, and the retaining plate provided with an elongated retaining perforation, for adapting and permitting the feed lever to swing without moving the hopper bottoms; so that, in operation, the hopper bottoms may convey and discharge the materials from the hoppers close together at rates adjustably variable from zero to maximum.

14. In a feeding apparatus, two stationary hoppers or compartments, each having a lateral outlet, and two movable hopper bottoms mounted, connected and adapted to be operated in unison and to always intercept the materials discharged from the hoppers, in combination with an oscillatory feed lever connected for operating the hopper bottoms and having a longitudinal slot, a fulcrum bearing block slidable within the slot in the feed lever, a fulcrum pivot about which the feed lever and said bearing block oscillate, having a bearing in and through said bearing block, an adjusting lever adapted and connected for shifting the fulcrum pivot and the fulcrum bearing block along the feed lever, a retaining plate adapted to retain the fulcrum pivot in different positions along the feed lever and a hand lever adapted and connected to shift the fulcrum pivot into and out of engagement with the retaining plate, one end of the slot in the feed lever being widened, the fulcrum bearing block cut away on both bearing sides between its two slot fitting portions and the retaining plate provided with an elongated retaining perforation, for adapting and permitting the feed lever to swing without moving the hopper bottoms; so that, in operation, the hopper bottoms convey and discharge the materials from the hoppers at rates adjustably variable from zero to maximum.

15. In a feeding apparatus, a stationary hopper having a lateral outlet, and a hopper bottom mounted for reciprocation beneath the hopper and adapted to always intercept the materials discharged from the hopper, in combination with an oscillatory feed lever connected for operating the hopper bottom, a fulcrum pivot on which the feed lever oscillates, an adjusting lever adapted and connected to shift the fulcrum pivot longitudinally of the feed lever, a retaining plate adapted to retain the fulcrum pivot in different positions along the feed lever and a hand lever adapted and connected to shift the fulcrum pivot into and out of engagement with the retaining plate; so that, in operation, the hopper bottom conveys and discharges the material from the hopper at adjustably variable rates.

16. In a feeding apparatus, two stationary hoppers separated by a space into which there is a lateral outlet from each hopper, two movable hopper bottoms separated by a discharge space, mounted and connected together for simultaneous operation and adapted to always intercept the materials discharged from the hoppers, in combination with an oscillatory feed lever slotted longitudinally and connected for operating the hopper bottoms, a fulcrum pivot pin extending through the slot in the feed lever, about which pin said lever oscillates, an adjusting lever adapted and connected to shift the fulcrum pivot pin along the feed lever, a retaining plate adapted to retain said fulcrum pin in different positions along the feed lever and means for shifting said pin endwise, one end of the slot in the feed lever widened and the retaining plate provided with an elongated retaining perforation, for adapting and permitting the feed lever to swing without moving the hopper bottoms; so that, in operation, the hopper bottoms convey and discharge the materials from the hoppers close together at rates adjustably variable from zero to maximum.

17. In a feeding apparatus, two stationary hoppers or compartments, each having a lateral outlet, and two movable hopper bottoms mounted, connected and adapted to be operated in unison and always intercept the materials discharged from the hoppers, in combination with an oscillatory feed lever slotted longitudinally and connected for operating the hopper bottoms, a fulcrum pivot pin extending through the slot in the feed lever, about which pivot pin said lever oscillates, an adjusting lever adapted and connected to shift the fulcrum pivot pin along the feed lever, a retaining plate adapted to retain said pivot pin in different positions along the feed lever and means for shifting said pivot pin endwise, one end of the slot in the feed lever widened and the retaining plate provided with an elongated retaining perforation for adapting and permitting the feed lever to swing without moving the hopper bottoms; so that, in operation, the hopper bottoms convey and discharge the materials from the hoppers close together at rates adjustably variable from maximum to zero.

In testimony whereof, I sign the foregoing specification, in the presence of two witnesses.

ALVAH L. POST.

Witnesses:
C. H. DORER.
B. C. BROWN